W. DIETER.
PRESSURE REDUCING VALVE FOR AUTOMOBILE TORPEDOES.
APPLICATION FILED SEPT. 29, 1919.

1,432,745.  Patented Oct. 24, 1922.

WITNESS:
René Bruine

INVENTOR:
William Dieter,
By Attorneys,
Fraser, Jurk & Myers

Patented Oct. 24, 1922.

1,432,745

UNITED STATES PATENT OFFICE.

WILLIAM DIETER, OF BROOKLYN, NEW YORK, ASSIGNOR TO VITTLEA DEVELOPMENT CORPORATION, A CORPORATION OF DELAWARE.

PRESSURE-REDUCING VALVE FOR AUTOMOBILE TORPEDOES.

Application filed September 29, 1919. Serial No. 327,253.

*To all whom it may concern:*

Be it known that I, WILLIAM DIETER, a citizen of the United States of America, residing in Brooklyn, in the county of Kings, city and State of New York, have invented certain new and useful Improvements in Pressure-Reducing Valves for Automobile Torpedoes, of which the following is a specification.

This invention provides a pressure reducer especially designed for use with automobile torpedoes for dropping from the flask pressure, which initially is about 2800 pounds per square inch, and gradually falls during the run to perhaps 600 pounds per square inch, to a constant working pressure at which the compressed air is fed to the engine or turbine, which ordinarily will approximate to from 400 to 500 pounds per square inch.

Such pressure-reducing valves are necessarily of the balanced valve type, and are located in the mid-compartment of the torpedo lying between the flask and the main bulkhead dividing such compartment from the afterbody. The engine or turbine is mounted in the afterbody just aft of said bulkhead, and the mid-compartment contains the starting valve, reducing valve, superheater, turbine nozzle and other mechanisms. In order to insure the free operation of such balanced reducing valves, it is necessary that the balancing plunger shall work freely, which involves the occurrence of a certain amount of leakage. The leakage past the valve mechanism has heretofore been discharged into the spring chamber, in which is enclosed the loading spring of the valve, whereby the eduction pressure, and in consequence the speed of the torpedo, is determined. The leakage has heretofore been vented from this chamber into the mid-compartment.

The present invention provides among other things, for excluding leakage from the mid-compartment and discharging it into the afterbody. The invention also introduces certain improvements in the pressure-regulating valve, as will be made apparent.

The accompanying drawings show suitable embodiments of the invention:

Figure 1:
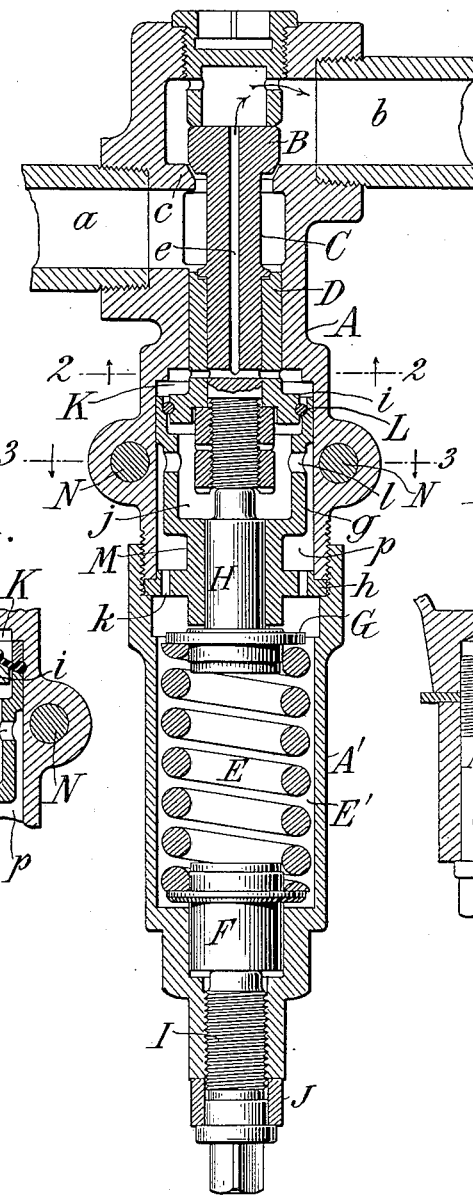
Figure 1 is a vertical longitudinal mid-section.
Figure 2:
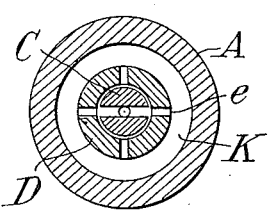
Fig. 2 is a cross-section on the line 2—2 in Fig. 1.

Referring to the drawings, A is the valve shell as a whole, having an inlet *a* and an outlet *b*; B is the valve or tappet, which may close against a seat *c*. C is the valve spindle, and D is the balancing plunger fixed thereon and having a diameter slightly exceeding the essential diameter of the tappet so as to slightly overbalance the latter; and E is the usual spring reacting against a flanged follower F and pressing against a flanged collar G which may be formed integrally on stem H, which stem communicates its stress to the valve stem C in a direction tending to open the valve. The parts described are of the usual and well-known construction, and the operation does not differ from that of similar pressure-reducing valves as heretofore made.

In the particular construction shown, the shell A is made in two parts, of which the lower section A' affords the housing for the spring, as heretofore, the spring being thus enclosed in a spring chamber E'. The lower end of this housing is threaded to engage the usual adjusting screw I for varying the stress of the spring by adjusting the flanged follower F to more or less compress the spring. This adjustment is determined according to the speed desired, by the insertion of a suitable speed ring J in the well-known manner.

The shell A is formed with a cylindrical portion forming a close working fit with the balancing plunger D, and beneath this is enlarged to form an annular chamber K which receives any leakage of air between the plunger and casing. A duct *e* which may conveniently be formed through the valve stem C, establishes communication between chamber K and the outlet side of the valve, so that the leakage can escape through this duct to the outlet and thus maintain in the chamber K the same pressure as on the outlet side of the valve. To prevent leakage of the pressure downward from chamber K, some suitable form of packing is provided between the bottom part of the plunger and the wall of the casing A. In the construction shown, the bottom end of the plunger D is enlarged to form a head or flange $i$, and a packing ring L is provided to afford a leak-tight joint between this flange and the wall of the casing. Preferably the casing is fitted with a lining shell $g$, which makes a close fit with the inner wall of the casing, and the packing ring L is confined in a groove formed in one or other of the parts $i$ $g$ and bears downwardly against a shoulder on the other part, so that it is supported against the downward pressure existing in chamber K and normally prevents the escape of such pressure downward into or toward the spring chamber E'. The packing must be so constructed as to not interfere with the normal movement of the valve B and plunger D, which, however, is within an extreme limit of about 3/100 inch. By forming the packing as a ring of firm dense but yielding rubber, round in cross-section, as shown, it readily partakes of a slight rolling movement, which, together with some slight compression of the rubber, proves ample for permitting the very limited movement required, without impairing the leak-tight connection.

The lining $g$ is best made integrally with a disk or shopper $h$ which forms a partition between the bored-out lower portion of the main shell A, and the spring chamber E', and which is confined against the bottom of the main section A by the screwing up of the lower shell A' of the casing. The parts $g$ $h$ are shown as constituting part of a fitting M, which also affords a central tubular guide for the plunger H. Vents $k$ are formed through the disk or flange $h$ to equalize the opposite pressures.

Figure 3:
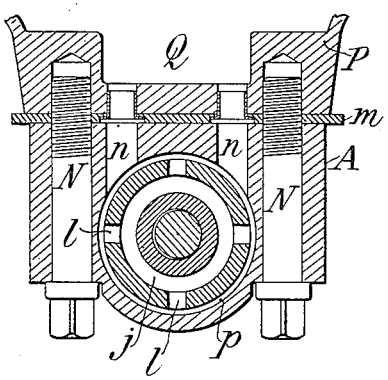
Fig. 3 is a cross-section on the line 3—3 therein.

The valve shell is fastenend in the usual manner by bolts N N passing through suitable perforated lugs on the shell and screwing into threaded holes in bosses forming part of the main bulkhed P, a fragment of which is shown in Fig. 3. Between the shell A and the bulkhead is introduced a packing $m$.

Owing to the high pressure dealt with, it is inevitable that however closely the lining $g$ may be fitted to the shell, and however effective may be the packing L, some leakage will pass into the lower part of the main shell A, which, if it were not vented out, would ultimately build up a pressure therein which would interfere with the normal operation of the reducing valve. Heretofore, as above stated, this pressure has been vented through the spring chamber into the mid-compartment of the torpedo. By the present invention it is vented into the afterbody. To accomplish this the chamber $j$ within the the lining $g$ is vented by holes $l$ into an outer annular chamber $p$, and this chamber is vented through holes $n$ $n$ into the chamber Q (Fig. 3) of the afterbody, being that space within the torpedo in the rear of the bulkhead or partition P.

The advantage of this improvement is that the spring can now be enclosed in an imperforate casing A', affording it a chamber sealed from the exterior, so that sea water, sand and the like cannot possibly find access to the spring chamber and work thence into contact with the bearing surfaces of the valve. The leakage is vented into the afterbody which receives the exhaust air and gases from the turbine, together with oil and other matters passing through with the spent motive fluid or dripping from the various bearings. Obviously the leakage, however slight or great it may be, can do no possible harm in this afterbody chamber.

In the drawing the valve is shown fully open in the position it assumes before launching, and the valve opening is somewhat exaggerated in order to make it apparent.

Figure 4:
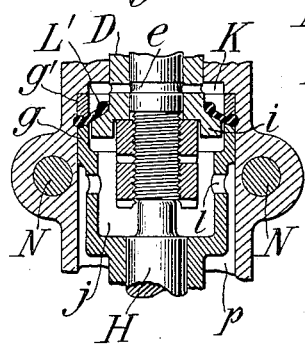
Fig. 4 is a fragment of Fig. 1 showing a modified packing construction.

Fig. 4 shows a modification of the packing means. Instead of the round rolling packing L of Fig. 1, a nearly flat packing ring or washer is shown at L', its outer margin being gripped between the lining $g$ and the segmental lining $g'$, while its inner margin rests freely on the flange $i$, which in this case has a rounded upper face against which the packing is held pressed by the pressure in the chamber K.

With either construction of packing the enlargement or flange $i$ at the bottom of the plunger D receives a downward pressure in the chamber K, which, being a constant pressure equal to that on the exhaust side of the valve of say 400 pounds per square inch, supplements the outlet pressure acting against the area of the outer end of the tappet B, and both tending to resist the opening movement of the valve and thus acting against the stress of the spring E. The effect of this pressure acting upon the greater area of the flange $i$, is to stabilize or steady the action of the valve and prevent fluctuating movements or chattering.

The construction may be varied in detail without departing from the essentials of the invention as hereinafter defined in the claims.

I claim as my invention:—

1. A pressure reducing valve for an automobile torpedo, having its shell adapted for attachment laterally with a transverse bulkhead of the torpedo, the valve shell having means for discharging leakage laterally through such bulkhead.

2. A pressure reducing valve for an automobile torpedo, having its shell formed with an external seating portion adapted for attachment with a transverse bulkhead of the torpedo, the valve shell having a conduit for conducting leakage from within the valve through such seating portion.

3. A pressure reducing valve, its shell formed with a seating portion, and means for fastening such portion against an upright supporting portion, the valve shell having openings adapted to vent leakage from within the valve shell through the support.

4. A pressure-reducing valve comprising a tappet and balancing plunger, and a spring tending to open the valve, the valve shell formed with a chamber receiving leakage past the plunger and vented to the outlet side of the valve, and formed with an imperforate chamber enclosing the spring, and means for venting leakage from the first-named chamber outside the valve shell whereby to avoid leaking pressure into the spring chamber.

5. A pressure-reducing valve comprising a tappet and balancing plunger, and a spring tending to open the valve, the plunger having an enlargement or flange, and the valve shell formed with an annular chamber receiving leakage past the plunger and enclosing said flange, said chamber being vented to the outlet side of the valve, and a packing washer closing the exit from said chamber for preventing leakage past said flange, said washer capable of adapting itself to the slight movements of the plunger flange during the operation of the valve.

6. A pressure-reducing valve comprising a tappet and balancing plunger, and a spring tending to open the valve, the plunger having an enlargement or flange, and the valve shell formed with an annular chamber receiving leakage past the plunger and enclosing said flange, said chamber being vented to the outlet side of the valve, and a packing washer closing the exit from said chamber, consisting of a yielding ring of round cross-section confined between said flange and the wall of said chamber, and adapting itself by a rolling movement to the slight movements of the plunger flange.

7. A pressure-reducing valve comprising a tappet and balancing plunger, and a spring tending to open the valve, the plunger having an enlargement or flange, and the valve shell formed with an annular chamber receiving leakage past the plunger and enclosing said flange, said chamber being vented to the outlet side of the valve, and a packing washer closing the exit from said chamber for preventing leakage past said flange, said washer consisting of a yielding ring of round cross-section and partially confined in a groove on one side so as to roll during the slight movements of the plunger against the opposing face.

In witness whereof I have hereunto signed my name.

WILLIAM DIETER.